United States Patent
Kress et al.

(10) Patent No.: US 6,769,865 B2
(45) Date of Patent: Aug. 3, 2004

(54) BAND COOLED TURBINE NOZZLE

(75) Inventors: Jeffrey Allen Kress, Cincinnati, OH (US); Robert Alan Frederick, West Chester, OH (US)

(73) Assignee: General Electric Company, Schenectady, NY (US)

( * ) Notice: Subject to any disclaimer, the term of this patent is extended or adjusted under 35 U.S.C. 154(b) by 189 days.

(21) Appl. No.: 10/104,211

(22) Filed: Mar. 22, 2002

(65) Prior Publication Data

US 2003/0180141 A1 Sep. 25, 2003

(51) Int. Cl.$^7$ ................................................. F01D 9/06
(52) U.S. Cl. ........................................ 415/113; 415/116
(58) Field of Search .............................. 415/115, 116, 415/112, 113

(56) References Cited

U.S. PATENT DOCUMENTS

| | | |
|---|---|---|
| 3,511,577 A | 5/1970 | Karstensen |
| 3,945,758 A | 3/1976 | Lee |
| 5,167,485 A * | 12/1992 | Starkweather ............... 415/115 |
| 5,211,533 A * | 5/1993 | Walker et al. ............... 415/115 |
| 5,215,435 A | 6/1993 | Webb et al. |
| 5,358,374 A | 10/1994 | Correia et al. |
| 5,488,825 A | 2/1996 | Davis et al. |
| 5,609,466 A | 3/1997 | North et al. |
| 5,749,701 A | 5/1998 | Clarke et al. |
| 6,065,928 A | 5/2000 | Rieck, Jr. et al. |
| 6,077,034 A * | 6/2000 | Tomita et al. ............... 415/116 |
| 6,398,485 B1 * | 6/2002 | Frosini et al. ............... 415/116 |

* cited by examiner

Primary Examiner—Edward K. Look
Assistant Examiner—Igor Kershteyn
(74) Attorney, Agent, or Firm—William S. Andes; Francis L. Conte

(57) ABSTRACT

A turbine nozzle includes hollow nozzle vanes mounted between outer and inner bands. The inner band includes an integral skirt around the perimeter thereof. A backing sheet of a honeycomb seal is mounted to the skirt to define a cavity therein. The inner band includes supply apertures for providing cooling air into the cavity, and the skirt includes forward and aft purge holes for discharging the cooling air therefrom. During operation, the air channeled through the cavity cools the backside of the inner band and is then discharged through the purge holes.

21 Claims, 3 Drawing Sheets

BAND COOLED TURBINE NOZZLE

BACKGROUND OF THE INVENTION

The present invention relates generally to gas turbine engines, and, more specifically, to turbine nozzles therein.

In a gas turbine engine, air is pressurized in a compressor and mixed with fuel in a combustor for generating hot combustion gases which flow downstream through turbine stages that extract energy therefrom. A high pressure turbine first receives the hot combustion gases from the combustor and includes a stator nozzle which directs the combustion gases downstream through a row of high pressure turbine rotor blades extending radially outwardly from a supporting rotor disk. In a two-stage turbine, a second stage stator nozzle is disposed downstream of the first stage blades followed in turn by a row of second stage rotor blades extending radially outwardly from another supporting disk.

The first and second rotor disks are joined to the compressor by a corresponding rotor shaft for powering the compressor during operation. A multistage low pressure turbine follows the two-stage high pressure turbine and is typically joined by a second rotor shaft to a fan disposed upstream from the compressor in a typical turbofan aircraft engine configuration for powering an aircraft in flight.

As the combustion gases flow downstream through the turbine stages energy is extracted therefrom and the pressure thereof is reduced. A substantial pressure drop occurs across the second stage turbine nozzle, for example, and an interstage seal is typically provided thereat to seal combustor gas leakage around the nozzle.

More specifically, an annular interstage seal ring is mounted axially between the first two rotor disks for rotation therewith during operation, and includes labyrinth seal teeth which extend radially outwardly. A honeycomb stator seal is mounted to the inner end of the second stage nozzle in close proximity to the seal teeth for effecting labyrinth seals therewith for minimizing fluid flow therebetween.

The interstage seal ring includes an annular forward portion which defines a forward cavity on one side of the seal teeth, and an aft portion which defines an aft cavity on the opposite side of the seal teeth.

The nozzle vanes are hollow and provided with a portion of pressurized air from the compressor which is used for cooling the vanes during operation. A portion of the vane air is then channeled radially inwardly through the inner band and discharged through corresponding rows of forward and aft purge holes which supply purge air into the corresponding forward and aft purge cavities on opposite sides of the seal teeth.

In order to enhance cooling of the nozzle vanes themselves, the vanes typically include one or more impingement baffles or inserts therein which have thin sheet metal construction with a multitude of impingement holes therethrough. The surrounding wall of the impingement baffle is spaced closely adjacent to the inner surface of the hollow vanes for discharging corresponding jets of impingement air thereagainst for enhanced cooling thereof. The spent impingement air may then be discharged through various film cooling holes formed through the pressure or suction sides, or both, of the vanes.

The radially outer and inner nozzle bands supporting the vanes provide corresponding boundaries for the combustion gas flow and require correspondingly less cooling thereof. In a typical configuration, each nozzle vane includes an inlet tube or spoolie extending outwardly from the outer band in which cooling air from the compressor is provided. The air travels radially inwardly through the impingement baffle inside each vane, and typically is channeled in part radially through the inner band for providing purge air into the corresponding forward and aft purge cavities.

In one configuration found in commercial service, a transfer tube extends through the inner band for providing pre-impingement air directly into a small cavity created under an individual vane by a sheet metal cover spaced closely adjacent thereto. The sheet metal cover itself is impingement cooled by the air channeled through the transfer tube, with the spent impingement air then being directed into the forward purge cavity, for example.

The interstage honeycomb seal typically includes a sheet metal backing sheet or plate which is suitably fixedly attached to corresponding portions of the inner band, typically without dedicated cooling circuits therefor.

This configuration of the inner band and honeycomb seal attached thereto requires multiple parts which increases the cost and complexity of the configuration. And, this configuration enjoys local cooling capability limited to directly below the individual nozzle vanes.

However, in the development of an improved turbofan gas turbine engine, the combustion gases discharged from the combustor and channeled to the second stage turbine nozzle have a maximum temperature or peak biased closer to the inner band, than the typical center-peaked temperature profile in previous engines. Accordingly, the inner band is subject to a greater heat load during operation and requires a cooling configuration specifically configured therefor for ensuring a suitable useful life of the second stage nozzle during operation.

Accordingly, it is desired to provide an improved turbine nozzle having inner band cooling in a configuration supporting an interstage honeycomb seal.

BRIEF DESCRIPTION OF THE INVENTION

A turbine nozzle includes hollow nozzle vanes mounted between outer and inner bands. The inner band includes an integral skirt around the perimeter thereof. A backing sheet of a honeycomb seal is mounted to the skirt to define a cavity therein. The inner band includes supply apertures for providing cooling air into the cavity, and the skirt includes forward and aft purge holes for discharging the cooling air therefrom. During operation, the air channeled through the cavity cools the backside of the inner band and is then discharged through the purge holes.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
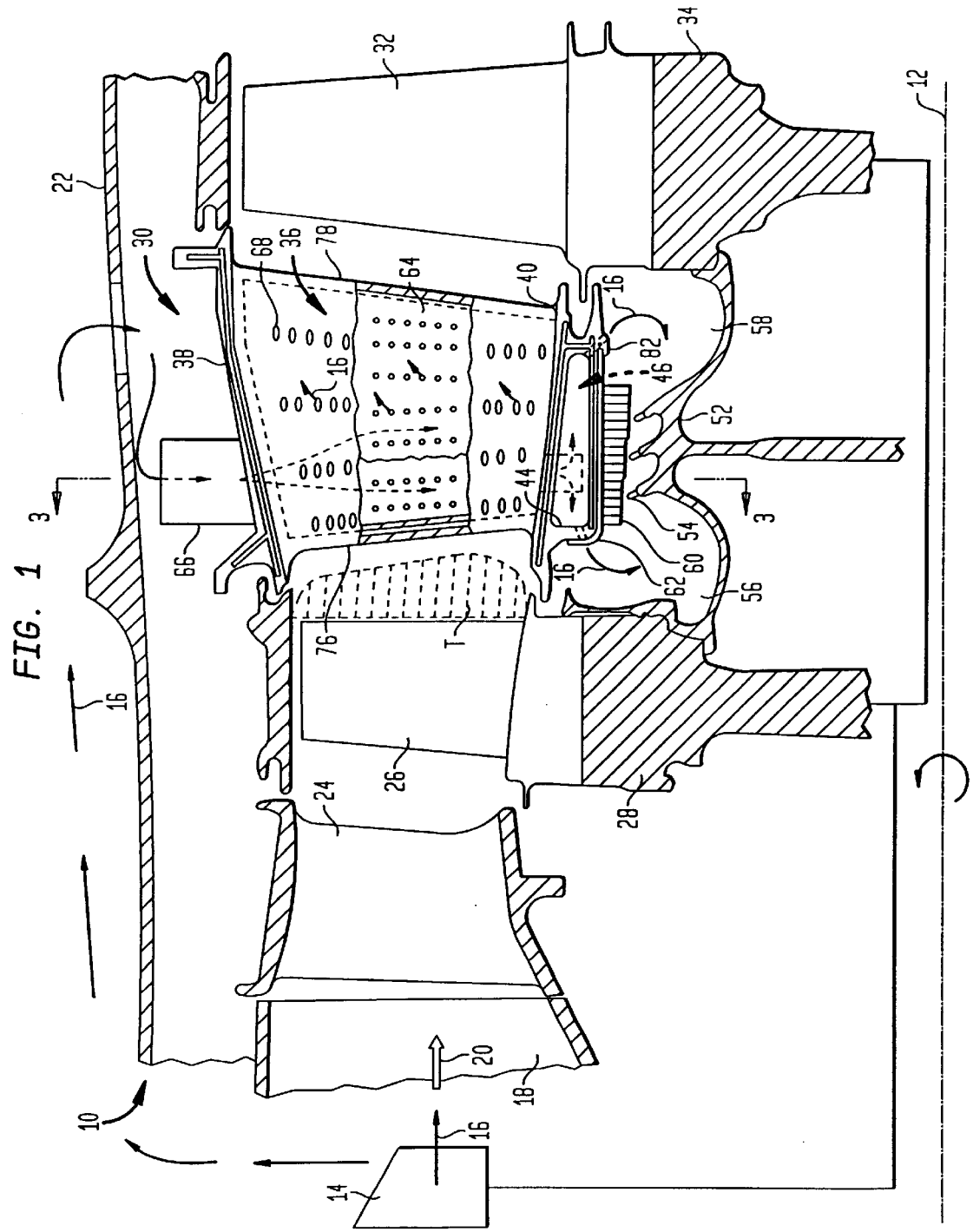
FIG. 1 is a partly schematic, axial section view through a portion of an exemplary turbofan gas turbine engine having a second stage turbine nozzle in accordance with an exemplary embodiment of the present invention.

Illustrated schematically in FIG. 1 is a portion of a gas turbine engine 10 in the exemplary form of a turbofan aircraft engine configured for powering an aircraft in flight. The engine is axisymmetrical about a longitudinal or axial centerline axis 12 and includes a conventional multistage axial compressor 14 disposed downstream from a fan (not shown). Air 16 first enters the engine through the fan and compressor wherein it is pressurized for discharge into an annular combustor 18, shown in aft part. The air is mixed with fuel in the combustor and ignited for generating hot combustion gases 20 which are discharged from the combustor in sequence through corresponding turbine stages.

A two-stage high pressure turbine (HPT) is illustrated in FIG. 1 in an exemplary configuration inside a surrounding annular inner casing 22.

The HPT includes an annular first stage turbine nozzle 24 which first receives the combustion gases from the outlet end of the combustor. The first stage nozzle may have any conventional configuration and includes a row of hollow stator vanes fixedly mounted to radially outer and inner bands suitably supported inside the engine.

A row of first stage rotor blades 26 extends radially outwardly from the perimeter of a supporting first rotor disk 28 which extracts energy from the combustion gases first discharged from the nozzle 24.

A second stage turbine nozzle 30 is suitably mounted directly downstream from the first stage blades 26 for redirecting the combustion gases through a downstream row of second stage rotor blades 32 extending radially outwardly from a corresponding second rotor disk 34. The first and second rotor disks 28,34 are fixedly joined to the rotor of the compressor 14 by a common rotor shaft extending therebetween, and energy extracted by the two stages of rotor blades is used for powering the compressor during operation.

Figure 2:
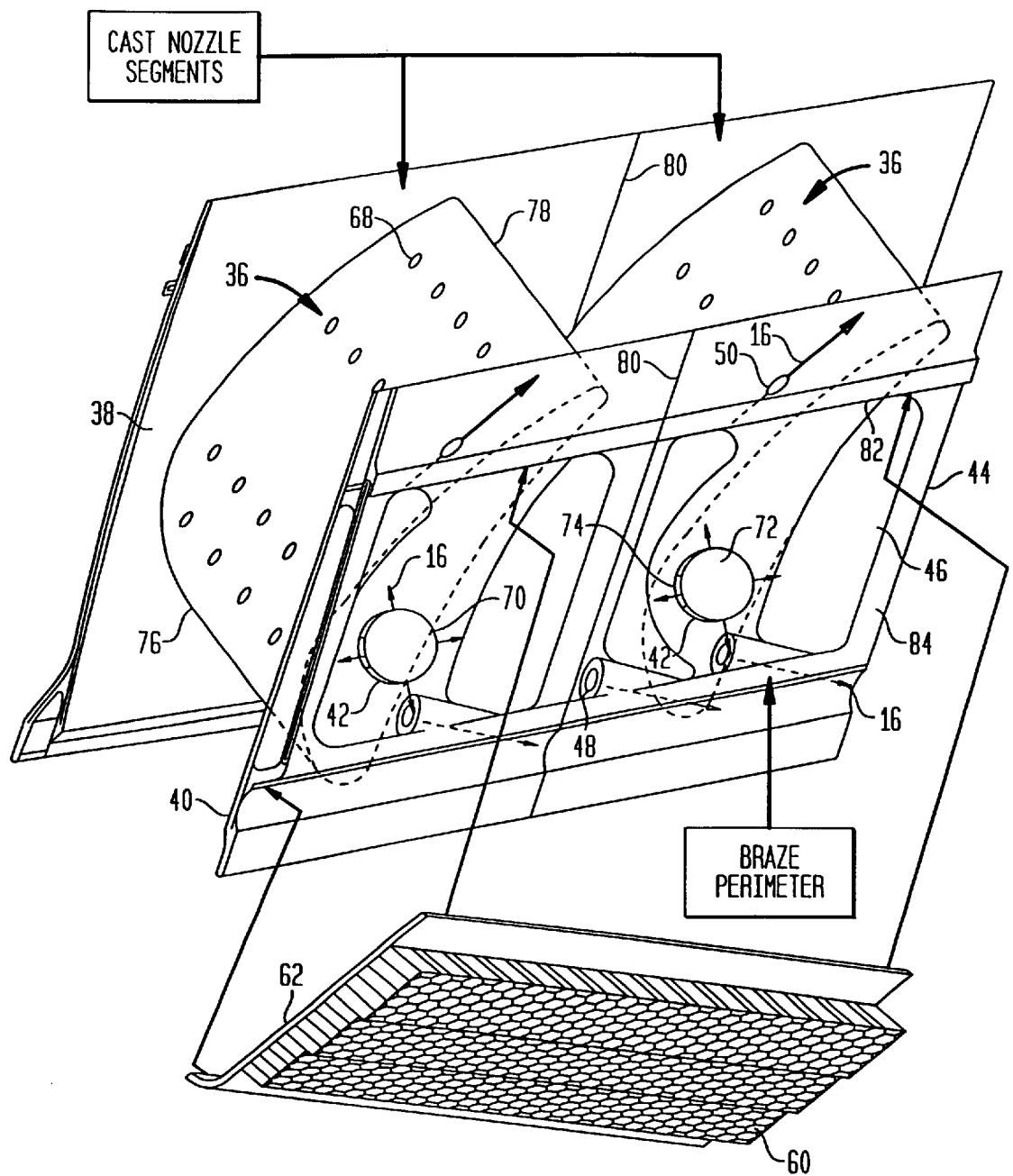
FIG. 2 is an exploded, isometric view of the underside of one of the segments of the turbine nozzle illustrated in FIG. 1.

The second stage turbine nozzle 30 illustrated in FIGS. 1 and 2 is a segmented ring including a pair of hollow nozzle or stator vanes 36 fixedly joined at opposite radial ends to corresponding radially outer and inner bands 38,40. The bands are arcuate segments, preferably with only two vanes per band segment, with the segments adjoining each other circumferentially and sealed together by corresponding spline seals disposed therebetween in a conventional manner.

In the exemplary configuration illustrated in FIG. 1, the combustion gases 20 are discharged from the combustor 18 with a radial temperature profile T having a maximum or peak temperature biased toward the inner flowpath boundary as opposed to the radial center of the flowpath span. In this way, the inner band 40 of the second stage turbine nozzle experiences higher heat loads than it otherwise would if the combustion gas temperature profile were center-peaked in the typical manner. The lower-span peaked temperature profile improves engine performance, but correspondingly subjects the nozzle inner band to a higher heat load.

Accordingly, the inner band 40 of the second stage nozzle has an improved configuration illustrated in more detail in FIG. 2 for providing effective cooling thereof in a simple and cost effective assembly for its use between the first and second high pressure turbine rotor stages.

Each nozzle segment illustrated in FIG. 2 includes a pair of supply apertures 42 extending radially therethrough corresponding with respective ones of the two vanes 36. The inner band also includes an integral skirt 44 extending radially inwardly from the perimeter of the inner band to define a common cooling cavity or plenum 46. The cooling cavity extends below the inner band of each segment and under both vanes for maximizing the exposed internal area of the inner surface of the inner band opposite to its external outer surface over which flow the hot combustion gases.

The skirt includes a row of forward purge holes 48 and row of aft purge holes 50 extending through the skirt at axially opposite ends of the inner band for flow communication with the cooling cavity. The supply apertures 42 provide inlets into the common chamber or cavity 46 for the cooling air, and the purge holes 48,50 provide outlets from the common cavity.

Referring again to FIG. 1, an interstage seal is defined between the first and second rotor disks 28,34 and includes an annular interstage seal ring 52 having a plurality of labyrinth seal teeth 54 extending radially outwardly therefrom. The ring 52 includes an annular forward portion adjoining the first disk 28 to define an annular forward purge cavity 56, and an annular aft portion adjoining the second rotor disk 34 to define an annular aft purge cavity 58. The seal ring 52 may have any conventional configuration with its forward and aft portions typically being in the form of integral blade retainers for retaining axial dovetails of the corresponding rotor blades 26,32 in their respective rotor disks.

The seal teeth 54 cooperate with an interstage stator honeycomb seal 60 having a thin sheet metal backing sheet or plate 62 suitably attached thereto. The honeycomb seal is supported from the inner band of the second stage nozzle to create a relatively small radial gap with the corresponding seal teeth 54 for maintaining differential pressure between the forward and aft purge cavities 56,58. The thin sheet metal backing sheet 62 may be locally reinforced by stiffening ribs such as the one illustrated in the center of FIG. 3.

In the preferred embodiment illustrated in FIGS. 1 and 2, the backing sheet 62 is brazed to the skirt 44 to sealingly enclose the cooling cavity 46 to permit circulation of the cooling air therein for enhanced cooling of the back side of the inner band during operation.

Figure 3:
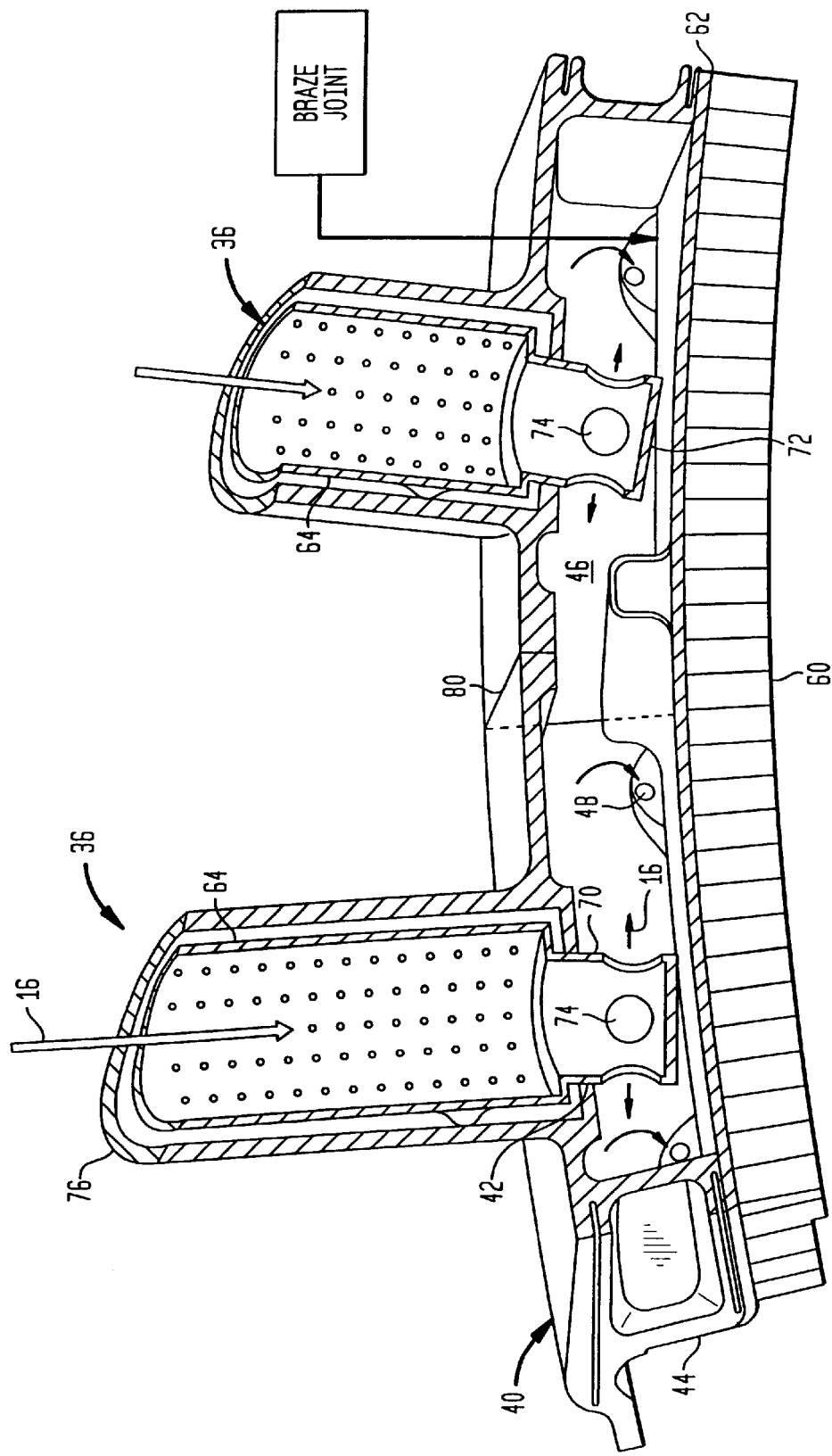
FIG. 3 is a partly sectional aft-facing-forward view of a portion of the turbine nozzle illustrated in FIG. 1 and taken along line 3—3.

As shown in more detail in FIGS. 2 and 3, the backing sheet 62 is preferably imperforate for sealingly closing the cavity 46 around its full perimeter by brazing thereto. And, the backing sheet is spaced substantially uniformly from the inner band in circumferential direction within the full perimeter of the surrounding skirt 44 to permit substantially unobstructed circulation of the cooling air along the entire inner surface of the inner band for convection cooling thereof. In this way, the cooling air may directly enter the cooling cavity 46 during operation and circulate within substantially the full extent of the inner band for cooling the inner band from the high heat load of the combustion gases flowable over the outer surface thereof.

As best shown in FIGS. 1 and 3, each of the vanes 36 preferably includes a perforate impingement baffle or insert 64 having a thin sheet metal configuration spaced closely adjacent to the inner surface of the hollow vane in any conventional manner. The baffle includes a multitude of small holes therein which direct the cooling air 16 in corresponding jets of air in impingement against the inner surface of the vane during operation.

As shown in FIG. 1, the outer band includes a corresponding inlet tube or spoolie 66 which extends radially therethrough in flow communication with the top of the corresponding impingement baffle for conventionally channeling a portion of compressor bleed air into the impingement baffle for flow radially inwardly therethrough. The cooling air channeled into the baffle is discharged in part through the impingement holes thereof inside the vanes, and may then be discharged through conventional film cooling holes 68 disposed in the opposite pressure or suction sides of the vanes, or both sides.

As shown in FIG. 3, each baffle 64 preferably also includes an outlet injector tube 70 extending through a corresponding one of the supply apertures 42 into the common cavity for supplying a portion of pre-impingement air from inside the baffles directly to the cavity 46 without first undergoing impingement cooling of the inner surface of the nozzle vanes. The bottom end of the baffle 64 may be closed by sheet metal to which the injector tube 70 is suitably brazed.

In the preferred embodiment illustrated in FIGS. 2 and 3, the injector tube 70 is cylindrical and has a circular sheet metal cap 72 suitably brazed thereto. The cap faces the backing sheet 62 for obstructing flow of the cooling air in impingement against the backing sheet. Correspondingly, each injector tube 70 includes at least one side aperture 74 for discharging the cooling air laterally into the cavity for circulation therein.

In the preferred embodiment illustrated in FIG. 3, the cap 72 is imperforate, and the injector tube 70 includes four of the side apertures 74 spaced apart from each other for providing multidirectional injection of the cooling air into the cooling cavity 46.

The injector tube 70 is sized with a suitable flow area for discharging a sufficient flow rate of cooling air inside the cooling cavity, and the one or more side apertures 74 preferably have a collective flow area substantially equal to that of the tube itself. In this way, the cooling air may be efficiently injected laterally into the cooling cavity for maximizing convection cooling of the inner surface of the inner band.

The radial height of the cooling cavity 46 is sufficiently large to ensure circulation of the cooling air discharged from the two injector tubes per nozzle segment within the common cavity 46 for substantially unobstructed flow circulation therein. The injector tubes 70 therefore extend from the inner band and radially inwardly across the span of the cavity to position the end cap 72 closely adjacent to the backing sheet 62. And, the side apertures 74 are preferably disposed centrally between the inner band and the backing sheet to distribute the cooling air laterally throughout the cavity without obstruction.

Since the backing sheet 62 is sheet metal, and the inner band and surrounding skirt are substantially thicker cast metal components subject to locally different operating environments, they correspondingly have different thermal response during operation. The cap 72 is provided at the end of the injector tube to minimize or prevent direct impingement cooling of the thermally fast responding backing sheet 62 which would be subject to locally high thermal stress and distortion under impingement cooling. Distortion of the backing sheet in turn distorts the honeycomb seal and can adversely affect sealing performance with the labyrinth seal teeth 54.

The lateral discharge of the cooling air from the injector tubes permits more uniform cooling of the surrounding components of the cooling cavity 46 for reducing thermal stress therein and reducing corresponding distortion. And, most significantly, a majority of the inner surface of the inner band is exposed to the circulating cooling air inside the cavity 46 for effective cooling of the inner band itself during operation.

As shown in FIGS. 1 and 2, each of the vanes 36 has axially opposite leading and trailing edges 76,78. Each vane also includes a generally concave pressure side and an opposite generally convex suction side extending axially between the leading and trailing edges, and radially in span between the outer and inner bands.

As shown in FIG. 2, the skirt 44 includes a forward wall disposed below the leading edges of the vanes, and an aft wall disposed below the trailing edges of the vanes. And, a pair of circumferentially opposite side walls or endwalls of the skirt are disposed at the opposite sides of the vane pair in each inner band segment defining a generally rectangular common cooling cavity 46 under both vanes.

As shown in FIGS. 2 and 3, each of the vanes 36 preferably comprises a common casting with corresponding half portions of the outer and inner bands 38,40 having common end faces or splitlines 80 brazed together to form an integral nozzle segment having the vane pair in the corresponding outer and inner bands. In this way, each vane may be cast with corresponding portions of the outer and inner bands, and corresponding portions of the integral skirt, and then the two cast vane segments and complementary portions of the skirt are joined together at the common splitlines and brazed therealong for forming an integrated, discrete assembly of two vanes and cooperating band segments. The nozzle segments, in turn, adjoin each other around the full circumference of the turbine nozzle and include conventional spline seals between the end faces thereof in a conventional sealing arrangement.

In the preferred embodiment illustrated in FIG. 3, the skirt 44 is part of the common casting with the inner band 40, with the forward and aft walls of the skirt initially split along the casting splitline during casting and prior to assembly by brazing thereat. A corresponding one of the skirt endwalls is initially cast in each vane segment, with the brazed-together skirt providing full perimeter enclosure of the common cavity 46.

In the preferred embodiment illustrated in FIGS. 1 and 2, the aft wall of the inner band skirt includes a circumferentially extending retention slot 82 which faces axially forwardly for receiving an aft end of the backing sheet 62 in a tongue and groove mechanical joint therewith. As shown in FIG. 2, the remaining two endwalls and forward wall of the skirt include generally flat, smooth narrow lands 84 configured for receiving in abutment thereagainst a corresponding perimeter of the backing sheet 62 which may then be conventionally brazed thereto.

And, the forward end of the backing sheet 62 is preferably arcuate or L-shaped in axial section and conforms to a complementary arcuate external surface of the skirt forward wall for extending the braze joint therewith. In this way, the lands provide narrow perimeter braze sealing of the backing sheet to the skirt, with the brazed-sealed aft end of the backing sheet being mechanically trapped in the retention slot 82, and the brazed-sealed forward end of the backing sheet being configured for carrying shear loads to increase bonding strength of the backing sheet to the skirt.

Since the differential pressure between the common cooling cavity 46 illustrated in FIG. 1 is greater with the aft purge cavity 58 then with the with the forward purge cavity 56, the aft retention slot 82 enhances the mechanical retention of the backing sheet against the greater differential pressure thereat.

The turbine nozzle disclosed above provides a specifically configured inner band and cooperating skirt for enhanced cooling of the inner band as well as complementing the desired purge flow into the forward and aft purge cavities. This combination of elements reduces parts count, reduces complexity, and substantially reduces cost of the turbine nozzle mounting the interstage honeycomb seal without compromising performance, yet enhancing cooling of the entire inner band.

The backing sheet of the honeycomb seal is directly mounted to the rigid cast skirt 44 by brazing thereto. The cooling cavity 46 defined between the inner band and the backing sheet provides substantially unobstructed circulation of cooling air over the back side of the inner band for effective cooling thereof against the increased heat load from the off-center peaked combustion gas profile. The injector tubes 70 are directly joined to the inner ends of the corresponding impingement baffles 64 for providing pre-impingement cooling air into the inner band cooling cavity with maximum pressure and maximum cooling capability.

The air is injected through the side apertures 74 of the injector tubes for circulation inside the common cavity without direct impingement cooling of the honeycomb seal backing sheet for reducing thermal stresses and corresponding distortion thereof. The singular retention slot 82 along with brazing of the backing sheet to the inner band skirt provide effective retention of the honeycomb seal reducing complexity over conventional bolted honeycomb seals or those seals with various forms of tongue and groove supporting hooks.

By integrating the skirt with the inner band, common castings may be used with the individual vane segments and their corresponding portions of the outer and inner bands for reducing manufacturing complexity and associated costs. In the preferred embodiment, two vane segments are brazed together to form a nozzle doublet segment with a common open ended cavity 46 which is simply closed by using the imperforate backing sheet of the honeycomb seal brazed to the perimeter of the skirt.

Alternatively, three vane segments may be brazed together to form a nozzle segment triplet, with the outboard vane segments having three skirt walls and the inboard vane segment having two skirt walls collectively forming a common cavity closed by the backing sheet. And, even a single vane segment may have its own inner band cavity defined by four skirt walls closed by the backing sheet.

Finally, in view of the circumferential continuity of the forward and aft walls of the band skirt, the forward and aft purge holes 48,50 may be formed therein with maximum tangential inclination not previously possible in limited space configurations. In this way, the purge holes may be directed for maximizing the velocity of the ejected purge air for minimizing differences in velocity with the rotating disks defining the forward and aft purge cavities. Improved efficiency of the discharge of the purge air from the common cooling cavity 46 may therefore be obtained.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine nozzle comprising:
   a pair of hollow nozzle vanes fixedly joined at opposite ends to outer and inner bands;
   said inner band having a pair of supply apertures extending therethrough corresponding with said vanes, and an integral skirt extending from a perimeter of said inner band to define a common cavity below said inner band and under said vanes;
   said skirt includes a plurality of forward and aft purge holes extending therethrough at opposite axial ends of said inner band in flow communication with said cavity;
   a honeycomb seal having a backing sheet brazed to said skirt to enclose said cavity to permit circulation of cooling air therein and cooling of said inner band; and
   each of said vanes comprises a common casting with corresponding half portions of said outer and inner bands having common splitlines brazed together to form an integral nozzle segment having said vane pair in said outer and inner bands.

2. A nozzle according to claim 1 wherein:
   said vanes have axially opposite leading and trailing edges; and
   said skirt includes a forward wall bridging said vane pair, an aft wall bridging said vane pair, and a pair of opposite endwalls disposed at opposite sides of said vane pair.

3. A nozzle according to claim 2 wherein said skirt aft wall includes a retention slot receiving an aft end of said backing sheet, and said skirt forward wall and endwalls include smooth lands brazed in abutment with said backing sheet.

4. A nozzle according to claim 3 wherein said backing sheet is imperforate, and spaced from said inner band within the full perimeter of said skirt to permit unobstructed circulation of said cooling air along the inner surface of said inner band for convection cooling thereof.

5. A nozzle according to claim 4 further comprising an impingement baffle disposed inside each of said vanes and including an injector tube extending through a corresponding one of said supply apertures into said cavity for supplying said cooling air thereto.

6. A nozzle according to claim 5 wherein said injector tube has a cap facing said backing sheet for obstructing flow of said cooling air, and a side aperture for discharging said cooling air laterally into said cavity.

7. A nozzle according to claim 6 wherein said cap is imperforate.

8. A nozzle according to claim 6 wherein said injector tube includes four of said side apertures spaced apart from each other.

9. A nozzle according to claim 6 wherein said injector tube has a flow area, and said side aperture has a flow area substantially equal thereto.

10. A nozzle according to claim 6 wherein said injector tube extends from said inner band and across said cavity to position said cap adjacent to said backing sheet, and said side aperture is disposed centrally between said inner band and backing sheet to distribute said cooling air laterally throughout said cavity without obstruction.

11. A turbine nozzle comprising:
    a pair of hollow nozzle vanes fixedly joined at opposite ends to outer and inner bands;
    said inner band having a pair of supply apertures extending therethrough corresponding with said vanes, and an integral skirt extending from a perimeter of said inner band to define a common cavity below said inner band and under said vanes;
    said skirt includes a plurality of forward and aft purge holes extending therethrough at opposite axial ends of said inner band in flow communication with said cavity; and a honeycomb seal having a backing sheet brazed to said skirt to enclose said cavity to permit circulation of cooling air therein and cooling of said inner band.

12. A nozzle according to claim 11 further comprising an impingement baffle disposed inside each of said vanes and including an injector tube extending through a corresponding one of said supply apertures into said cavity for supplying said cooling air thereto.

13. A nozzle according to claim 12 wherein said injector tube has a cap facing said backing sheet for obstructing flow of said cooling air, and a side aperture for discharging said cooling air laterally into said cavity.

14. A nozzle according to claim 13 wherein said vanes have axially opposite leading and trailing edges, and said skirt at an aft end of said inner band below said vane trailing edges includes a retention slot receiving an aft end of said backing sheet, and a remainder of said skirt includes smooth lands brazed in abutment with said backing sheet.

15. A nozzle according to claim 14 wherein said backing sheet is imperforate, and spaced from said inner band within the full perimeter of said skirt to permit unobstructed circulation of said cooling air along the inner surface of said inner band for convection cooling thereof.

16. A nozzle according to claim 13 wherein each of said vanes comprises a common casting with corresponding half portions of said outer and inner bands having common splitlines brazed together to form an integral nozzle segment having said vane pair in said outer and inner bands.

17. A nozzle according to claim 16 wherein said skirt comprises a common casting with said inner band, and includes a forward wall bridging said vane pair with said brazed splitline therebetween, and an aft wall bridging said vane pair with said brazed splitline therebetween, and a pair of opposite endwalls disposed at opposite sides of said vane pair.

18. A turbine nozzle comprising:

a pair of hollow nozzle vanes fixedly joined at opposite ends to outer and inner bands;

said inner band having a pair of supply apertures extending therethrough corresponding with said vanes, and an integral skirt extending from the perimeter of said inner band to define a common cavity below said inner band and under said vanes;

said skirt includes a plurality of forward and aft purge holes extending therethrough at opposite axial ends of said inner band in flow communication with said cavity;

a honeycomb seal having a backing sheet brazed to said skirt to enclose said cavity to permit circulation of cooling air therein and cooling of said inner band;

an impingement baffle disposed inside each of said vanes and including an injector tube extending through a corresponding one of said supply apertures into said cavity for supplying said cooling air thereto; and said injector tube has a cap facing said backing sheet for obstructing flow of said cooling air, and a side aperture for discharging said cooling air laterally into said cavity.

19. A nozzle according to claim 18 wherein:

each of said vanes comprises a common casting with corresponding half portions of said outer and inner bands having common splitlines brazed together to form an integral nozzle segment having said vane pair in said outer and inner bands; and said skirt comprises a common casting with said inner band, and includes a forward wall bridging said vane pair with said brazed splitline therebetween, and an aft wall bridging said vane pair with said brazed splitline therebetween, and a pair of opposite endwalls disposed at opposite sides of said vane pair.

20. A nozzle according to claim 19 wherein said skirt aft wall includes a retention slot receiving an aft end of said backing sheet, and said skirt forward wall and endwalls include smooth lands brazed in abutment with said backing sheet.

21. A turbine nozzle comprising:

a plurality of hollow nozzle vanes fixedly joined at opposite ends to outer and inner bands;

said inner band for each of said vanes having a supply aperture extending therethrough corresponding with said vane, and an integral skirt extending from a perimeter of said inner band under each of said vanes to define a corresponding cavity below said inner band;

said skirt includes a plurality of forward and aft purge holes extending therethrough at opposite axial ends of said inner band in flow communication with said cavity; and a honeycomb seal having a backing sheet brazed to said skirt to enclose said cavity to permit circulation of cooling air therein and cooling of said inner band.

* * * * *